United States Patent [19]

Tsuge et al.

[11] Patent Number: 4,775,183

[45] Date of Patent: Oct. 4, 1988

[54] CHILD PASSENGER SEAT FOR VEHICLE

[75] Inventors: Hiroshi Tsuge; Chikao Nagasaka; Motonobu Sugiura, all of Aichi, Japan

[73] Assignees: Kabushiki Kaisha Tokai-Rika-Denki Seisakusho; Toyota Jidosha Kabushiki Kaisha, both of Aichi, Japan

[21] Appl. No.: 85,245

[22] Filed: Aug. 11, 1987

Related U.S. Application Data

[63] Continuation of Ser. No. 826,362, Feb. 5, 1986.

[30] Foreign Application Priority Data

Feb. 6, 1985 [JP] Japan .................. 60-15786

[51] Int. Cl.[4] .............................................. A47C 1/00
[52] U.S. Cl. ............................. 297/219; 5/485; 297/250
[58] Field of Search .......................................... 5/471

[56] References Cited

U.S. PATENT DOCUMENTS

| | | | |
|---|---|---|---|
| 1,934,615 | 11/1933 | Selverstone | 297/229 |
| 3,515,430 | 6/1970 | Nelson | 297/218 |
| 3,517,963 | 6/1970 | Woods et al. | 297/229 X |
| 3,981,534 | 9/1976 | Wilton | 297/219 |
| 4,014,055 | 3/1977 | Torres | 5/485 |
| 4,073,539 | 2/1978 | Caruso | 297/455 |
| 4,165,125 | 8/1979 | Owen | 5/485 |
| 4,169,627 | 10/1979 | Murphy et al. | 297/455 X |
| 4,188,065 | 2/1980 | Meeker | 297/219 X |
| 4,339,835 | 7/1982 | Jaffe | 5/485 X |
| 4,456,302 | 6/1984 | Knoedler et al. | 297/250 X |
| 4,553,786 | 11/1985 | Lockett et al. | 297/250 X |

Primary Examiner—Peter A. Aschenbrenner
Attorney, Agent, or Firm—Sixbey, Friedman, Leedom & Ferguson

[57] ABSTRACT

A child passenger seat includes a shell mounted on and secured to a seat of a vehicle and supporting a webbing which restrains the body of a child passenger in an emergency situation of the vehicle. The child passenger seat further includes a cover which is fitted over the shell and provided with a pocket for accommodating a cushioning pad. Accordingly, it is possible for the pad to be removed from the cover so as to be replaced or washed.

9 Claims, 3 Drawing Sheets

CHILD PASSENGER SEAT FOR VEHICLE

This application is a continuation, of application Ser. No. 826,362, filed Feb. 5, 1986.

BACKGROUND OF THE INVENTION

1. Field of the Invention

The present invention relates to a child passenger seat for a vehicle which is capable of restraining the body of a child passenger seated thereon in an emergency situation of the vehicle.

2. Description of the Related Art

Child passenger seats are employed for restraining the bodies of child passengers when an emergency situation of the vehicle occurs.

A typical conventional child passenger seat is arranged such that the main structure of the seat is mounted on a seat of a vehicle, and a restraining means provided on the main structure, such as a seatbelt means, is fastened around the body of a child passenger.

The main structure of this type of child passenger seat is preferably provided with a cushioning pad for the purpose of absorbing the impact applied when the body of a child passenger hits the seat structure. The pad is usually attached to the seat structure by means of bonding, and this involves a risk of bonding failure which would cause the pad to separate from the seat structure and also involves difficulties in replacing or washing the pad when stained to a substantial extent.

SUMMARY OF THE INVENTION

In view of the above-mentioned circumstances, it is a primary object of the present invention to provide a child passenger seat for a vehicle so designed that the cushioning pad thereof is readily replaced or washed.

To this end, the present invention provides a child passenger seat for a vehicle in which a cover of the seat is provided with a double-sheet portion for accommodating a cushioning pad.

By virtue of this arrangement, the handling of the cushioning pad is facilitated, since the pad is mounted on the cover and need not be attached directly to the shell by bonding or other similar means.

The shell is preferably provided with a pad accommodating recess, whereby it is possible to prevent the seating surface for a child passenger from becoming uneven to a substantial degree.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

One embodiment of the child passenger seat according to the present invention will be described hereinunder.

Figure 1:
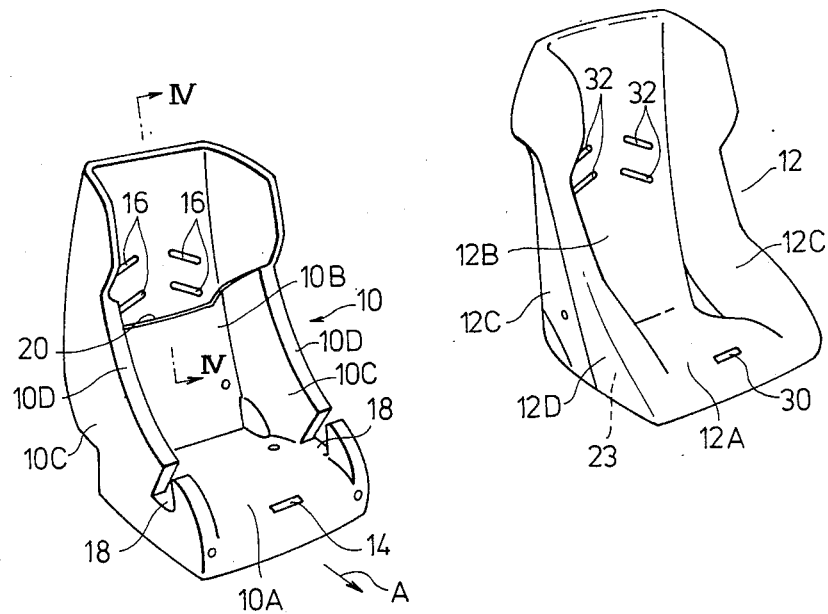
FIG. 1 is an exploded perspective view of one embodiment of the child passenger seat according to the present invention.
Figure 2:
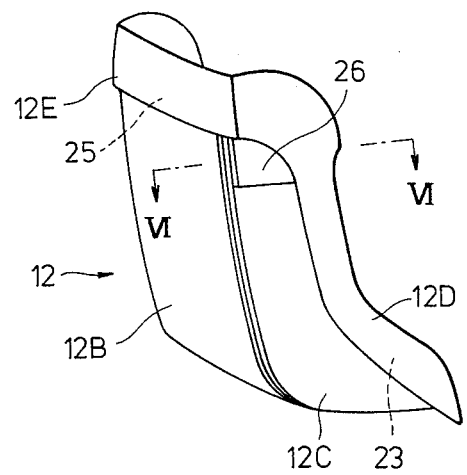
FIG. 2 is a perspective view of the cover shown in FIG. 1.

FIG. 1 is an exploded perspective view of the child passenger seat which includes a shell 10 and a cover 12 which is fitted over it.

It is preferable that the shell 10 is integrally molded from a material which is able to bear a predetermined load, such as a synthetic resin. The child passenger seat is mounted on a seat of a vehicle in such a manner that the front end of the seat which faces in the direction of the arrow A is directed toward the front end of the vehicle.

The shell 10 includes a seat panel 10A and a backrest panel 10B which extends upwardly from the rear end of the seat panel 10A. A pair of side panels 10C are connected to the right and left ends of the seat and backrest panels 10A and 10B. The seat panel 10A is provided with a through-hole 14 for passing a crotch belt (not shown), while the backrest panel 10B is provided with through-holes 16 for passing shoulder belts (not shown). The crotch and shoulder belts which are passed through the through-holes 14 and 16 are retained by the shell 10 at the rear sides of the seat and backrest panels 10A and 10B, respectively.

Notches 18 are respectively provided in the end faces 10D of the side panels 10C which face the front end of the vehicle so that an adult passenger restraining means provided on a seat of the vehicle are passed through the notches 18, and the shell 10 is thereby secured to the seat of the vehicle.

Figure 4:
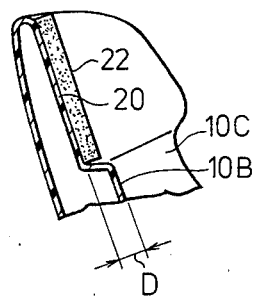
FIG. 4 is a sectional view taken along the line IV—IV of FIG. 1.
Figure 5:
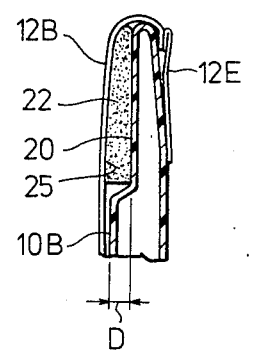
FIG. 5 is a sectional view corresponding to a section taken along the line IV—IV of FIG. 1, which shows the way in which the pad is mounted on the cover.

As also shown in FIG. 4, recesses 20 are formed in the upper end portions of the seating surfaces defined by the backrest and side panels 10B, 10C of the shell 10, the recesses 20 having a depth D. A cushioning pad 22 is fitted in and bonded to the recess 20 formed in the backrest panel 10B.

The cover 12 is constituted by a fabric structure or the like which includes a seat member 12A, a backrest member 12B which is integrally connected to the end of the seat member 12A on the side thereof which is closer to the rear end of the vehicle, and a pair of side sheet members 12C which are respectively sewn to the lateral edges of the seat and backrest members 12A and 12B. When the cover 12 is fitted over the shell 10, the seat, backrest and side members 12A, 12B and 12C are respectively brought into contact with the surfaces of the seat, backrest and side panels 10A, 10B and 10C, thus defining a seating surface for a child passenger.

The forward end portions (as viewed in the longitudinal direction of the vehicle) of the side members 12C are sewn to the forward end portions of outer members 12D, respectively. In consequence, pouch-like portions 23 are respectively defined between the side members 12C and the outer members 12D, the rear sides of the pouch-like portions 23 being open, so that the pouch-like portions 23 can be respectively fitted over the side panels 10C of the shell 10.

A rear member 12E is sewn to the upper end portion of the seat member 12A. The right and left end portions (as viewed longitudinally of the vehicle) of the rear member 12E are respectively sewn to the rear ends of the upper portions of the side members 12C. Consequently, a pouch-like portion 25 is defined between the rear member 12E and the backrest member 12B, the lower side of the pouch-like portion 25 being open, and the portion 25 being communicated with the pouch-like portions 23 defined between the side members 12C and the outer members 12D.

Thus, the cover 12 is mounted on the shell 10 in such a manner that the pouch-like portions 23 and 25 are respectively fitted over the upper portions of the side and backrest panels 10C and 10B of the shell 10, whereby it is possible for the cover 12 to be readily fitted over the shell 10.

Figure 3:
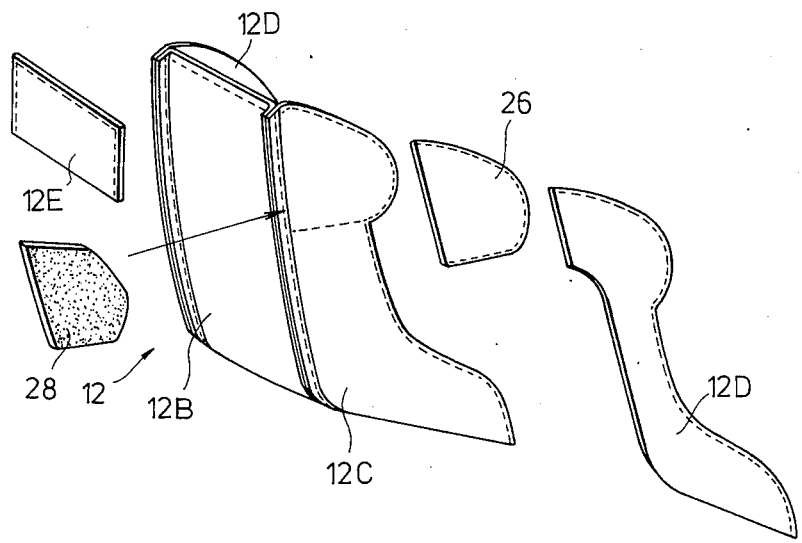
FIG. 3 is an exploded perspective view of the cover.
Figure 6:
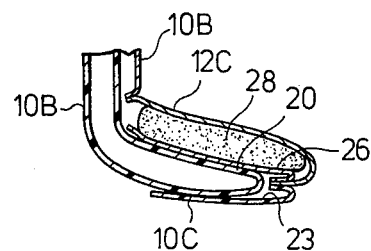
FIG. 6 is a sectional view taken along the line VI—VI of FIG. 2.

As shown in FIG. 3 in detail, a pocket-defining member 26 is provided between each of the side member 12C and the corresponding outer member 12D. The configuration of the pocket-defining member 26 is made conformable to that of the upper end portion of the side member 12C. The upper and forward end portions of the pocket-defining member 26 is sewn together with the side member 12C and the outer member 12D when these members are sewn together. The lower end portion of the pocket-defining member 26 is sewn to the side member 12C. Thus, the pocket-defining member 26 defines a pocket the rearward side of which is open and which can accommodate a cushioning pad 28. In consequence, the pad 28, together with the pocket-defining member 26, protrudes from the surface of the side member 12C and is accommodated within the recess 20 formed in the inner side of the side panel 10C when the cover 12 is fitted over the shell 10, as shown in FIG. 6.

It is to be noted that the seat and backrest members 12A, 12B of the cover 12 are respectively provided with through-holes 30, 32 which respectively correspond to the through-holes 14, 16 provided in the shell 10 so that the through-holes 30, 32 can pass the crotch and shoulder belts, respectively.

In the child passenger seat in accordance with this embodiment, arranged as detailed above, the pad 22 is attached to the recess 20 in the backrest panel 10B of the shell 10 in advance by means, for example, of bonding. The thickness of the pad 22 is set such as to be substantially equal to the depth of the recess 20.

Similarly, the pads 28 are respectively inserted into the pockets defined by the pocket-defining members 26 of the cover 12. The thickness of these pads 28 is set such as to be similar to that of the pad 22.

Then, the cover 12 is mounted on the shell 10, whereby the former is fitted over the latter, and the pads 28 are respectively accommodated in the recesses 20 of the side panels 10C.

Since the pads 22 and 28 are accommodated in the respective recesses 20, there is no risk of the upper end portions of the backrest and side panels 10B and 10C greatly protruding toward the child passenger seated on the seat, so that he feels no unpleasantness and can enjoy a comfortable ride.

This child passenger seat is mounted on a seat of a vehicle and secured to the seat by utilizing the notches 18, and a child passenger is thereby allowed to seat himself on the seat member 12A. After the child passenger has been seated, the crotch and shoulder belts projecting from the seating surface are passed over the front side of the body of the child passenger and engaged with each other, thereby allowing his body to be fastened by these restraining means. Thus, when an emergency situation of the vehicle occurs, the body of the child passenger is restrained by the restraining means.

The pad 22 in the described embodiment may be accommodated in a pocket which is formed on the cover 12 beforehand in a manner similar to that of the pads 28.

Since the pads 28 are accommodated in the pockets, it is possible for the pads 28 to be readily replaced or washed by taking them out of the pockets when necessary.

What is claimed is:

1. A child passenger seat for protecting a child passenger, comprising:
    (a) a load bearing seat shell mounted on a vehicle and provided with a child passenger restraining belt wherein said seat shell includes a seat panel, a backrest panel, and a pair of side panels; said backrest and side panels being contiguous with said seat panel;
    (b) a seat cover formed from sheet material that is fitted over said shell and which defines a seating surface for a child passenger, said cover having a seat sheet, a backrest sheet and a pair of side sheets which are respectively brought into contact with said seat, backrest and side panels;
    (c) a double-sheet portion provided on the sheet material which includes a first sheet member having peripheral portions secured to a second sheet member for admitting a cushioning pad, and a pouch for receiving a portion of a side panel of the seat shell in order to mount the cover onto said seat shell, whereby said pad is freely insertable into and removable from said cover; and
    (d) a recess provided in an upper end portion of the backrest panel for receiving said pad,
    wherein said double-sheet portion overlies said recess, and the pad received in the double-sheet portion does not extend over an edge of the recess.

2. A child passenger seat according to claim 1, wherein said double-sheet portion is defined by a sheet member having peripheral portions thereof secured to backrest sheet.

3. A child passenger seat according to claim 2, wherein said seat is located within a vehicle having a rear end, and said inlet opening of said pocket is provided on the side thereof which is closest to the rear end of the vehicle.

4. A child passenger seat according to claim 2, wherein said sheet member is secured to said cover by sewing.

5. A child passenger seat according to claim 1, wherein a recess is formed in each of said side panels, and each of said recesses defines a pad receiving portion.

6. A child passenger seat for use in a vehicle so designed that the body of a child passenger is restrained by a webbing in an emergency situation of the vehicle, said seat comprising:
    (a) a seat shell having an interior side that provides a seating surface for the passenger, and exterior side, and a front and a back that is securable on a seat of the vehicle, wherein said shell supports said webbing, and includes a seat panel, a backrest panel and a pair of side panels which are connected together in one unit;
    (b) a seat cover having a front and a back that is fittable over the front and back of said shell which includes a seat sheet, a backrest and a pair of side sheets, said cover defining a seating surface for a child passenger, and further including an outer sheet which is connected to front end portions of said side sheets and disposed over the exterior side of said shell;

(c) a pair of sheet members having edges that are sewn to the front edges of the side sheets and the outer sheet for forming pockets between said sheet member and said side sheets on either side of the cover having openings for admitting a cushioning pad into and out of said pockets, and for forming pouches that are separate from said pockets for receiving a portion of the side panels of the seat shell in order to mount the cover onto said seat shell; and (d) a cushioning pad in each of said pockets.

7. A child passenger seat according to claim 6, wherein said shell is provided with recesses for receiving said pads when said pads are disposed within and enveloped by said pockets.

8. A child passenger seat according to claim 6, wherein the openings of each of the pockets further face the back of the shell.

9. A child passenger seat for use in a vehicle of the type that includes a webbing for restraining the child passenger in an emergency situation of the vehicle, comprising:

(a) a seat shell that is securable on a seat of the vehicle and that includes a webbing, said shell being formed from a seat panel, a backrest panel and a pair of side panels that are connected together in one unit, and having an interior side that receives and supports the child passenger, and an exterior side that abuts said vehicle seat when said seat shell is secured thereto;

(b) a cover having a front portion and a rear portion that is fittable over the seat shell that includes a seat sheet, a backrest sheet and a pair of opposing side sheets which overlie said seat panel, backrest panel and side panels, respectively when said cover is fitted over said seat shell, wherein said cover further includes a pair of double sheets attached around to the front edges of each of the side sheets for defining both a pocket having an open edge for admitting a cushioning pad into and out of said pocket, and a pouch having an opening for receiving a portion of a side panel of the seat shell in order to mount said cover onto said seat shell.

* * * * *